May 3, 1932.  W. E. FOSTER  1,856,380
MIXING VALVE
Filed May 31, 1930
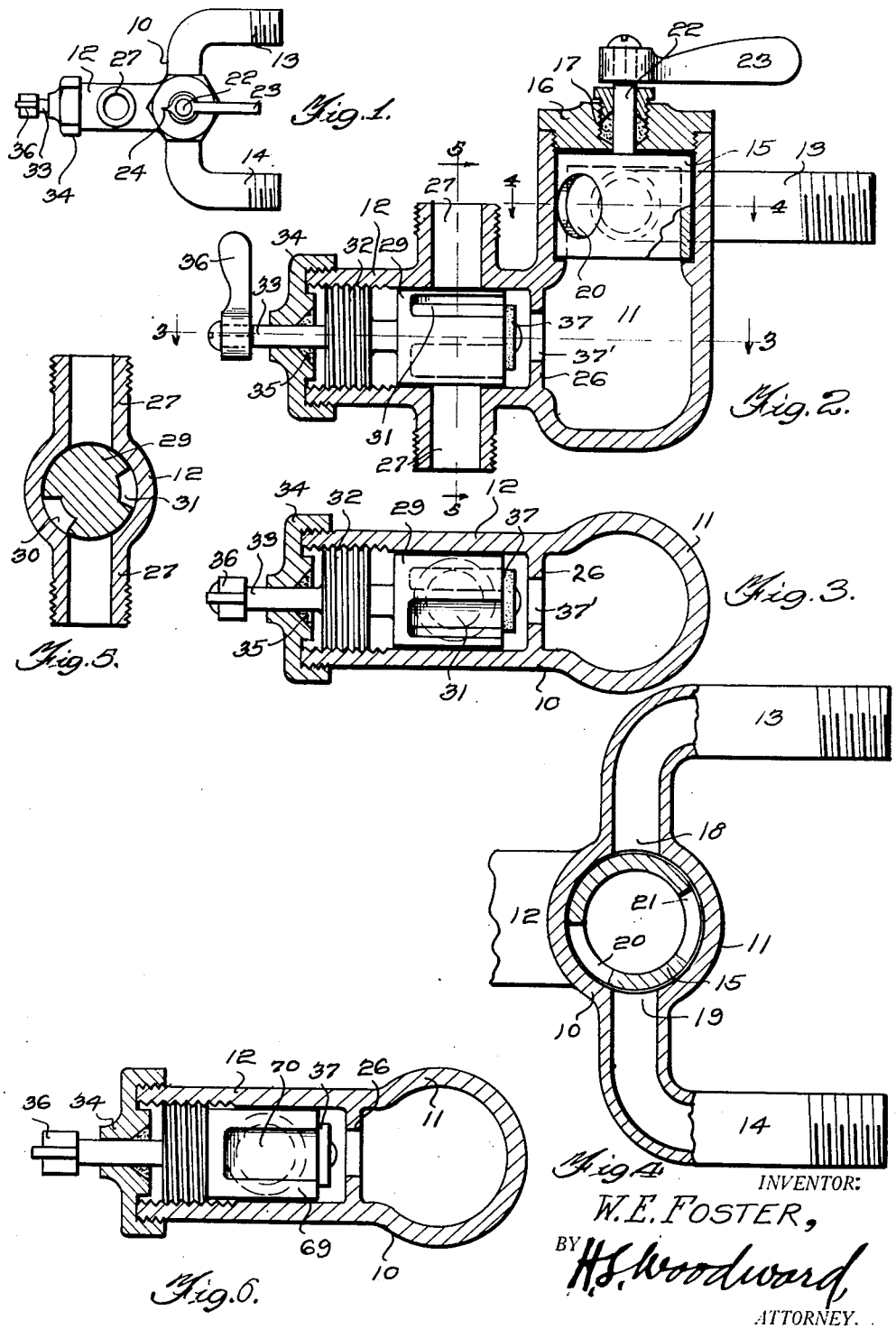
INVENTOR:
W. E. FOSTER,
BY H. S. Woodward
ATTORNEY.

Patented May 3, 1932

1,856,380

UNITED STATES PATENT OFFICE

WILLIAM E. FOSTER, OF NEW BEDFORD, MASSACHUSETTS

MIXING VALVE

Application filed May 31, 1930. Serial No. 458,479.

The invention relates to mixing valves and particularly has for an aim to provide a combined mixing valve and two-way valve, whereby water may conveniently be directed either into a bath tub or to a shower; while at the same time it is modulated in temperature to suit the requirements of the user. It is an important object to present a construction of the case and valve parts involving but a low cost for casting, machining, and other production operations, as well as being extremely simple so that it is liable in a minimum degree to derangement, so that its operation may be readily understood by the ordinary user, and whereby its servicing and upkeep cost will be reduced to a minimum.

It is also a purpose to present a novel form of valve suitable for use in the device shown.

It is an object of importance to present a valve which may have its packing material renewed when required, without necessity of draining the valve in order to replace packing and operative parts minimizing the objectionable features so often present in the replacement of parts in valves. The valve is especially designed as a safety appliance for use in controlling the temperature of water for shower baths, permitting the water to pass through a waste spigot while the temperature is being regulated, and when properly modulated, permitting diversion from the waste to the shower head.

Additional objects, advantages and features of the invention may appear from the following description, particularly with relation to specific construction and relative arrangement of parts, the accompanying drawings forming a part of the disclosure, wherein—

Figure 1 is a top view of the valve.

Figure 2 is a vertical sectional view of the valve.

Figure 3 is a horizontal section on the line 3—3 of Figure 2.

Figure 4 is a similar section on the line 4—4 of Fig. 2.

Figure 5 is a vertical section of the valve on line 5—5 of Fig. 2.

Figure 6 is a view like Fig. 3 of a modification of the valve 29.

There is illustrated in Figure 2 a valve case 10, comprising a main mixing valve section 11 substantially cylindrical on a vertical axis, from the lower part of which there is extended a distributing section 12 cylindrical and on a horizontal axis. On the upper half of the section 11 at respective sides there are formed hot and cold water supply nipples 13 and 14, their points of beginning being on a common axis, both being curved rearward and their extremities constructed for proper connection with supply pipes. The section 11 is smoothly finished interiorly and fitted with a tubular cylindrical plug valve 15, closed at its upper end and mounted in a suitable bonnet 16, having a familiar form of renewable packing 17. The inlet nipples 13 and 14 terminate at respective ports 18 and 19 opening on the interior of the section 11, and the valve 15 is formed so as to close these ports when at initial position as illustrated. The plug is provided with a slot 20 adjacent the cold water port 19 so that on operative rotation from initial position this port may be fully uncovered while the hot water port 18 is still closed. A second slot 21 is formed in the plug so located that when the cold water port is fully opened as last mentioned, the slot 21 will be immediately beside the hot water port 18 and further movement will uncover the port 18. At the same time the slot 20 is so proportioned that after opening of port 18 its advancing side will begin closing of the port 19. The slot 21 is sufficiently wide to permit full uncovering of the port 18 when the port 19 has been closed. The plug 15 is formed with a stem 22 fitted with a handle 23 and pointer 24 coordinated with index characters 25 on the top of the hood. The hood may be screwed into place and may be removed for renewal of the packing after the handle 23 is off, without displacement of the valve 15.

A ported web or partition 26 is formed at the junction of the section 12 with the section 11 of the case, and this web is ported in alinement with the axis of the section 12. Respective lateral nipples or spouts 27 are formed opening from the interior of the section 12 spaced slightly outward from the partition or web 26.

A plug or distributor valve 29 is snugly and revolubly fitted in the section 12, having a longitudinal groove 30 at one side opening on the inner end of the valve and a second similar groove 31 located approximately 90 degrees therefrom on the periphery of the plug. The plug is formed with a threaded piston portion 32 engaged in a corresponding interiorly threaded outer end part of the section 12, and from this in turn there extends a stem 33 through a bonnet 34, wherein a suitable packing 35 is incorporated in any usual or approved manner. The stem is provided with a handle 36 for operation of the distributor valve 29. The extremity of the plug 29 is fitted with a stop washer 37 adapted to seat over the port 37' of the partition 26, when the valve is at the inner limit of its movement.

By the use of this construction the tight closure of the valve is assured notwithstanding that both valves are cylindrical and it is not practicable to retain a good tight valve with cylindrical ported faces. One of the outlets of the section 12 may be extended upward as shown for connection with a shower spray head or other point of use. The other outlet of the section 12 may extend downward for discharge into the bath tub or elsewhere. The plug 29 is so formed that the groove 30 communicates with the lower outlet after the plug has been given an opening movement of 90 degrees, so that the water is emitted at lower outlet 27 and may discharge to the bath tub or other waste means, while the temperature of the mixture is being adjusted by the valve 15. After the proper temperature is attained, the valve 29 is turned further in the opening direction, and this moves the groove 30 out of line with the lower outlet and also opens still further the port of the partition 26, and after 90 degrees of this further movement the groove 31 comes into alinement with the upper outlet 27 so that water may then pass to the spray head.

In Figure 6 an alternative form of valve for the section 12 of the case 10 is shown, in which the plug 69 corresponding to the plug 29 is merely flattened at one side as at 70, instead of being formed with grooves as first mentioned, its inner end being fitted with a stop washer as in the first valve coacting with the ported partition as first described. The valve otherwise may be the same as first described. With this valve the flat 70 is simply moved to aline with either outlet 27 and the direction of the handle may indicate the direction and extent of outflow.

I claim:—

In a mixing and distributing valve for the purposes described, a case having a mixing and a distributing chamber, a port forming communication therebetween, said mixing chamber having hot and cold water inlets, a valve therein cooperative with the inlets to modulate the temperature of the mixture admitted from the inlets, a screw-mounted distributing valve in said distributing chamber coaxial with the communicating port, a compression valve on the distributing valve arranged to seat in the communicating port at initial position, said distributing chamber having a safety outlet and a second outlet, said distributing valve constructed to uncover the safety outlet only, after predetermined initial opening movement; and being constructed to close the last named outlet on further opening movement and to open the second outlet solely thereafter on further opening movement.

In testimony whereof I affix my signature.

WILLIAM E. FOSTER.